(12) United States Patent
Cizeron et al.

(10) Patent No.: US 7,240,483 B2
(45) Date of Patent: Jul. 10, 2007

(54) PRE-COMBUSTORS FOR INTERNAL COMBUSTION ENGINES AND SYSTEMS AND METHODS THEREFOR

(75) Inventors: Joel M. Cizeron, Sunnyvale, CA (US); Ralph A. Dalla Betta, Mountain View, CA (US)

(73) Assignee: Eaton Corporation, Cleveland, OH (US)

( * ) Notice: Subject to any disclaimer, the term of this patent is extended or adjusted under 35 U.S.C. 154(b) by 205 days.

(21) Appl. No.: 10/910,213

(22) Filed: Aug. 2, 2004

(65) Prior Publication Data

US 2006/0021331 A1 Feb. 2, 2006

(51) Int. Cl.
*F01N 3/00* (2006.01)

(52) U.S. Cl. .............. 60/286; 60/274; 60/295; 60/297; 60/303; 60/309; 60/311; 48/197 R; 422/182; 422/183

(58) Field of Classification Search .............. 60/272, 60/274, 286, 295, 297, 300, 303, 309, 311; 48/197 R; 422/172, 178, 182, 183
See application file for complete search history.

(56) References Cited

U.S. PATENT DOCUMENTS

| 5,209,062 | A | * | 5/1993 | Vollenweider | 60/280 |
|---|---|---|---|---|---|
| 5,250,489 | A | | 10/1993 | Dalla Betta et al. | |
| 5,512,250 | A | | 4/1996 | Betta et al. | |
| 5,964,088 | A | * | 10/1999 | Kinugasa et al. | 60/286 |
| 6,021,639 | A | * | 2/2000 | Abe et al. | 60/297 |
| 6,203,770 | B1 | * | 3/2001 | Peter-Hoblyn et al. | 423/212 |
| 6,266,956 | B1 | * | 7/2001 | Suzuki et al. | 60/278 |
| 6,363,716 | B1 | * | 4/2002 | Balko et al. | 60/286 |
| 6,530,215 | B2 | | 3/2003 | Alkemade et al. | |
| 6,832,473 | B2 | * | 12/2004 | Kupe et al. | 60/286 |
| 6,868,668 | B2 | * | 3/2005 | Suzuki | 60/286 |
| 2003/0101713 | A1 | | 6/2003 | Dalla Betta et al. | |
| 2004/0050037 | A1 | | 3/2004 | Betta et al. | |
| 2004/0187483 | A1 | | 9/2004 | Dalla Betta et al. | |

FOREIGN PATENT DOCUMENTS

| DE | 100 42 010 A1 | 3/2002 |
|---|---|---|
| JP | 9-317440 A | 12/1997 |
| WO | WO-2004/04651 A1 | 6/2004 |

* cited by examiner

*Primary Examiner*—Binh Q. Tran
(74) *Attorney, Agent, or Firm*—Paul V. Keller

(57) ABSTRACT

Described here are systems and methods for treating fuel injected exhaust streams. In general, the systems comprise a fuel injector, a pre-combustor, and a fuel combustor. The methods described herein include methods for regenerating a $NO_x$ trap or a DPF, and methods for generating a substantially uniform fuel air mixture at a fuel combustor inlet, or a substantially uniform temperature at a fuel combustor outlet. The methods of regenerating a $NO_x$ trap typically comprise the steps of injecting fuel into an exhaust stream, passing the stream through a pre-combustor, operating the pre-combustor to at least partially combust the injected fuel, reacting the fuel and exhaust stream mixture within a fuel combustor to generate a reducing gas mixture, and introducing the reducing gas mixture into a $NO_x$ trap, whereby the $NO_x$ trap is regenerated. Similar methods for regenerating a diesel particulate filter are also described. Control strategies are also provided.

49 Claims, 5 Drawing Sheets

PRE-COMBUSTORS FOR INTERNAL COMBUSTION ENGINES AND SYSTEMS AND METHODS THEREFOR

FIELD

This invention relates generally to internal combustion ("IC") engines, and more particularly, to pre-combustors, systems, and methods for improving the performance and emission control of IC engines that produce nitrogen oxides ("$NO_x$") emissions.

BACKGROUND

Due to increasingly strict governmental emission regulations, efforts to reduce emissions from IC engines have increased. These regulations have posed and will continue to pose particular problems for diesel engines, which while being very efficient, often produce very high emissions of $NO_x$ and particulate matter ("PM"). After treatment of diesel engine exhaust is often needed to help reduce diesel engine emissions, because diesel engines cannot be made sufficiently clean by modification of the engine design alone. This after treatment typically includes the use of a diesel particulate filter ("DPF") and/or a $NO_x$ trap.

The DPF is typically a ceramic filter placed in the exhaust stream. The PM, which primarily consists of carbon particulates, collects in and on the DPF and clogs the filter, causing increased back pressure that reduces engine efficiency or makes the system inoperable. A $NO_x$ trap is placed in the exhaust stream and has an adsorbent that adsorbs the $NO_x$ from the exhaust stream. Similar to the DPF, when the adsorbent has reached its maximum adsorbing capacity, the $NO_x$ trap is essentially rendered useless in that no $NO_x$ is adsorbed. Both the DPF and $NO_x$ trap must be regenerated to maintain their effectiveness.

DPF regeneration usually occurs when the carbon particulates collected in the DPF are combusted when the DPF temperature rises past a minimum threshold. This increase in DPF temperature is typically a direct result from an increase in exhaust temperature when the engine is operated at high load. However, when engine operation does not provide engine exhaust temperatures high enough to regenerate the DPF, the exhaust stream or the DPF must be heated by other methods. For example, fuel may be combusted on the DPF or on a fuel combustor placed upstream of the DPF to heat the exhaust stream. However, a challenge for systems using this type of fuel injection and combustion is in obtaining a uniform concentration of fuel in the flow through the DPF, or through the upstream fuel combustor. Non-uniformity may lead to non-uniform cleaning, overheating, localized stresses, cracking, and other damage to the DPF or upstream fuel combustor.

A $NO_x$ trap typically contains an adsorbent-catalyst system that provides the dual functions of $NO_x$ trapping and $NO_x$ reduction. Usually one component of the $NO_x$ trap adsorbs $NO_x$ in the exhaust stream under oxidizing conditions, or conditions where the exhaust stream contains excess oxygen. This component is typically selected so that when the exhaust stream is made reducing, the $NO_x$ is released. The $NO_x$ trap also contains a $NO_x$ reduction catalyst upon which $NO_x$ reacts with a reducing agent under reducing conditions to form non-polluting $N_2$. That is, when the exhaust stream is made reducing, the $NO_x$ is released and reacts with the reducing agent on the reduction catalyst to form $N_2$.

As noted above, the $NO_x$ trap environment must be made reducing in order to convert the trapped $NO_x$ to $N_2$. One way to produce this reducing environment is to modify the engine operation so that it operates in a rich mode. However, such a modification would require significant deviation from normal engine operation. For example, a diesel engine, which usually operates without a throttle on the air intake, would now require a throttle to drive the fuel air mixture into the rich regime. In addition, this would have to be done quickly and frequently, for example, about every 2 to 20 minutes. Similar, to the DPF regeneration mentioned above, fuel may be injected into the exhaust stream and combusted on the $NO_x$ trap or on an upstream fuel processor in order to both consume the oxygen and to produce the reducing environment, see for example Applicants Co-pending U.S. patent application Ser. Nos. 10/431,171 and 10/309,936, each of which is hereby incorporated by reference herein in their entirety. However, use of diesel fuel by direct injection into the exhaust stream is not very effective at exhaust stream temperatures ranging from 150° C. to 250° C., which covers a significant portion of the operating cycle of a diesel engine, including idle and low load.

Accordingly, improved systems and methods for treating fuel injected exhaust streams would be desirable. In addition, it would also be desirable to provide improved systems and methods for regenerating a DPF or $NO_x$ trap. In a like manner, it would be desirable to, provide systems and methods that could provide a substantially uniform fuel air mixture at the inlet of a DPF or a fuel combustor, and/or systems and methods capable of quickly heating a fuel combustor or fuel processor to a temperature within its operating range.

SUMMARY

Described here are systems for treating fuel injected exhaust streams. In one variation, the systems comprise a fuel injector, a pre-combustor, and a fuel combustor or fuel processor. The fuel injector is typically located along an exhaust stream and is configured to inject fuel into the exhaust stream, which comprises air. The pre-combustor comprises a support material having at least two adjacently disposed longitudinal channels for passage of a gas therethrough. The longitudinal channels have inner surfaces and at least a portion of the inner surfaces of at least one of the channels is coated or impregnated with a catalytic material. In some variations, the longitudinal channels are configured in a herringbone pattern.

The fuel combustor or fuel processor comprises an inlet, an outlet, at least one lumen adapted for the passage of gas therethrough, and a catalytic material. The fuel combustor or fuel processor is located downstream of the pre-combustor, and the pre-combustor is configured to provide a substantially uniform fuel air mixture at the fuel combustor or fuel processor inlet. Here, and throughout the remainder of this specification, the term "fuel combustor" will be used interchangeably with the term "fuel processor" and will be taken to mean both the reaction of fuel with oxygen (combustion) and in the absence of oxygen, the reaction of fuel with water vapor (fuel processing or reforming) to produce reducing species, such as $H_2$ and CO.

In some variations the systems further comprise a mixer located upstream of the fuel combustor. The mixer may be a static mixer, a length of pipe, a swirler, or the like. In some variations, at least a portion of the mixer is coated with a catalyst capable of catalyzing the oxidation of varnish or carbonaceous deposits. The systems may further comprise a $NO_x$ trap or a diesel particulate filter, located downstream of the fuel combustor.

In some variations, the pre-combustor is about 0.05 to about 1 times the volume of the fuel combustor, in other variations the pre-combustor is about 0.1 to about 0.7 times the volume of the fuel combustor, and in yet other variations, the pre-combustor is about 0.2 to about 0.4 times the volume of the fuel combustor. In some variations, the average hydraulic diameter of the pre-combustor channels is about 0.2 mm to about 10 mm, about 0.5 mm to about 7 mm, or about 1 mm to about 5 mm.

The catalyst support material of the pre-combustor may be made at least in part from metal, an iron based or other alloy, or the like, or it could be made from ceramic, such as, e.g., cordierite or silicon carbide. The support material may further comprise a washcoat of zirconia, titania, alumina, silica, lanthanum, cerium, calcium, barium, chromium, and mixtures thereof. Similarly, the catalytic material of the pre-combustor may comprise palladium, platinum, mixtures thereof, and the like. The pre-combustor may further comprise a source of electric energy.

Also described are methods for regenerating a $NO_x$ trap. The methods typically comprise the steps of injecting fuel into an exhaust stream, optionally mixing the exhaust stream with the injected fuel with at least one mixer, passing the exhaust stream and fuel mixture through the pre-combustor, operating the pre-combustor to at least partially combust the injected fuel, optionally passing the partially combusted mixture through a mixer, reacting the fuel and exhaust stream mixture within a fuel processor to generate a reducing gas mixture comprising CO and $H_2$, and introducing the reducing gas mixture into a $NO_x$ trap, whereby the $NO_x$ trap is regenerated. The exhaust stream is located upstream of a pre-combustor and comprises air. The pre-combustor is located upstream of the fuel processor and comprises an inlet, an outlet, and a catalytic material. The fuel processor is located downstream of the pre-combustor, and comprises an inlet, an outlet, and a catalytic material. The $NO_x$ trap is located downstream of the fuel processor.

The exhaust stream may comprise compression ignited engine exhaust or spark ignited engine exhaust. Typically, the fuel comprises hydrocarbons, for example, gasoline or diesel fuel. The fuel may be vaporized prior to injection or it may not be. In some variations, the fuel is injected at an equivalence ratio greater than 1. In other variations, the fuel is injected at an equivalence ratio from about 2 to about 5. In some variations, the step of injecting fuel into the exhaust stream comprises pulsing the injection of fuel into the exhaust stream. The methods described here may further comprise the step of electrically heating the pre-combustor. It should be noted that fuel may also be injected by the engine cylinder fuel injection system late in the combustion cycle, after the combustion cycle or during the exhaust cycle. This fuel would travel through the engine exhaust manifold and exhaust system, and may still be highly non-uniform when the fuel exhaust mixture reaches the fuel combustor. In this case, a pre-combustor may be advantageous and used to produce a more uniform fuel concentration for the fuel combustor.

Methods for generating a substantially uniform fuel air mixture at a fuel combustor inlet, or a substantially uniform temperature at a fuel combustor outlet, are also described. In general, these methods comprise the steps of injecting fuel into an exhaust stream located upstream of a pre-combustor, passing the exhaust stream and fuel mixture through the pre-combustor, and operating the pre-combustor to produce a substantially uniform fuel air mixture at an inlet of a fuel combustor, or to produce a substantially uniform temperature at a fuel combustor outlet. The exhaust stream comprises air. The fuel combustor comprises an inlet, an outlet, a catalytic material, and is located downstream of the pre-combustor. The pre-combustor comprises an inlet, an outlet, and a catalytic material.

In some variations, these methods further comprise the step of mixing the exhaust stream with the injected fuel with at least one mixer, which may, for example, be located at a position upstream of the fuel combustor. The mixer may be a static mixer, a length of pipe, a swirler, or the like. At least a portion of the mixer may be coated with a catalyst capable of catalyzing the oxidation of varnish or carbonaceous deposits.

Methods for regenerating a diesel particulate filter are also described. In general, these methods comprise the steps of injecting fuel into an exhaust stream located upstream of a pre-combustor, optionally mixing the exhaust stream with the injected fuel with at least one mixer, passing the exhaust stream and fuel mixture through the pre-combustor, operating the pre-combustor to raise the temperature of the injected fuel and exhaust stream mixture, reacting the injected fuel and exhaust stream mixture within a fuel combustor to further increase the temperature of the injected fuel and exhaust stream, and introducing the injected fuel and exhaust stream mixture into a diesel particulate filter located downstream of the fuel combustor, whereby the diesel particulate filter is regenerated. In some variations, the fuel combustor can be eliminated and the fuel combustion can be accomplished on the diesel particulate filter.

The exhaust stream comprises air. The pre-combustor comprises an inlet, an outlet, and a catalytic material, and the fuel combustor comprises an inlet, an outlet, and a catalytic material, and is located downstream of the pre-combustor. In some variations, the methods comprise the step of electrically heating the pre-combustor.

The exhaust stream may comprise compression ignited engine exhaust or spark ignited engine exhaust. Similarly, the fuel may comprise hydrocarbons, for example, gasoline or diesel fuel. In some variations, the fuel is vaporized prior to injection. In some variations, the fuel is injected at an equivalence ratio less than 1. The step of injecting fuel into the exhaust stream may also comprise pulsing the injection of fuel into the exhaust stream.

DETAILED DESCRIPTION

I. Systems

Figure 1:
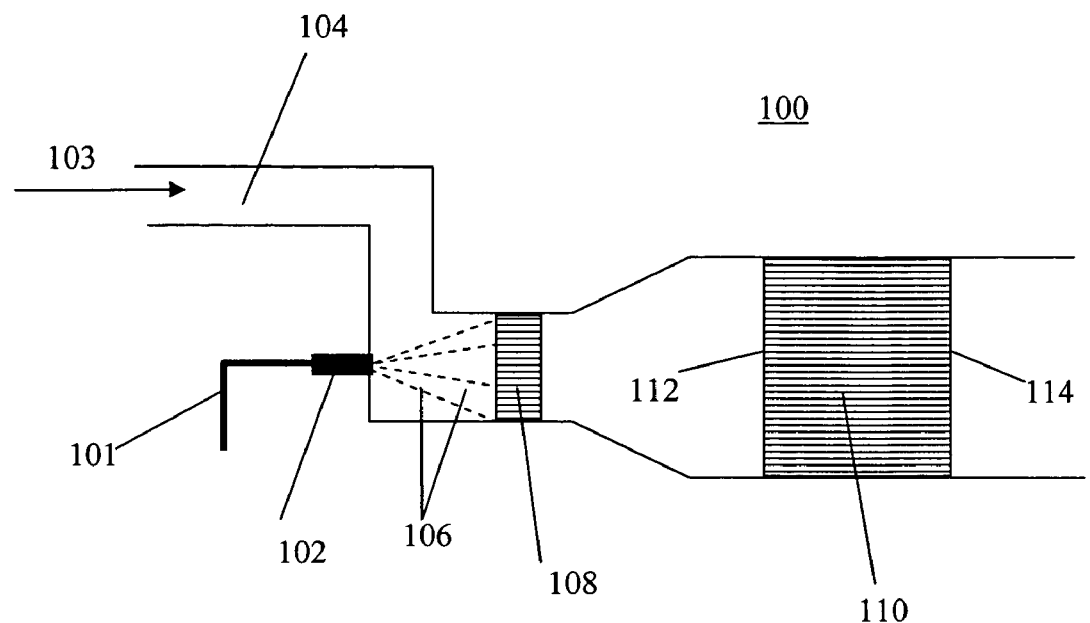
FIG. 1 illustrates an exemplary system having a fuel injector, a pre-combustor, and a fuel combustor.

Described here are systems and methods for treating fuel injected exhaust streams, and specifically, for either generating high exhaust temperatures or generating a reducing exhaust mixture and reactive reductants. In some variations, the systems comprise a fuel injector, a pre-combustor, and a fuel combustor. For example, shown in FIG. 1 is system (100) comprising fuel injector (102) located along an exhaust stream (104) and configured to inject fuel (106) into the exhaust stream (104). A pre-combustor (108) is located downstream of the fuel injector (102). A fuel combustor (110) may be located downstream of the pre-combustor (108) as depicted in FIG. 1. The fuel combustor (110) comprises an inlet (112), an outlet (114), and defines at least one lumen adapted for the passage of gas therethrough.

In general, the systems are used to either produce a substantially uniform fuel air mixture at a main catalyst inlet (e.g., a fuel combustor, an oxidation catalyst, a reforming catalyst, a combination of oxidation and reforming catalyst, etc.), to produce a substantially uniform temperature at a main catalyst outlet, to combust fuel to raise the temperature of a downstream filter or trap, or to help produce a reducing mixture substantially free of oxygen (e.g., a mixture of CO and $H_2$) in order, e.g., to regenerate a $NO_x$ trap. Accordingly, many suitable system configurations are possible. For example, the system may further comprise a DPF, a $NO_x$ trap, a combination of the two, and the like. The components of the system (e.g., the pre-combustor and the fuel combustor) may be packaged in a single unit, or may be packaged as individual components connected together.

A. Pre-Combustor

In general, the pre-combustor may be used to provide a substantially uniform fuel air mixture at a fuel combustor inlet, to provide a substantially uniform temperature at a fuel combustor outlet, to combust fuel to heat up the fuel combustor, or to help provide a rich reducing mixture for $NO_x$ trap regeneration. The pre-combustor may also be configured to provide combinations of these functions. Accordingly, in some variations, the pre-combustor comprises a support material and has at least two adjacently disposed longitudinal channels (not shown) for passage of a gas therethrough. The longitudinal channels have inner surfaces, and in some variations, at least a portion of the inner surfaces of at least one of the channels is coated or impregnated with a catalytic material, and at least a portion is not coated with a catalyst. For example, in some variations, the pre-combustor is formed of a corrugated foil, which is coated with a catalyst on one side and then rolled into a spiral fashion so as to form a monolithic structure containing channels coated with catalyst and channels not coated with catalyst. The fraction of channels coated with catalyst can vary from about 5% to about 95% and in some variations from about 20% to about 80%. If a herringbone corrugated foil is coated on one side with catalyst and then folded in half and rolled into a spiral configuration, 50% of the channels will be coated with catalyst and 50% will not be coated with catalyst. Such a structure would have the ability to combust very non-uniform fuel concentrations since the catalyst coated surface will be cooled by the surface not coated with catalyst. In addition, such monolithic structures formed by rolling catalyst coated foils would have adjacent layers that are not bonded together and would allow adjacent layers to slip and move both axially and circumferentially with respect to each other. Such movement would make the structure very tolerant of thermal gradients within the monolithic structure since thermal gradients would cause gradients in thermal expansion and localize stress if the structure cannot relieve this stress. Such a loose non-bonded structure could be significantly more tolerant to rapid thermal transients and to thermal gradients caused by non-uniform fuel concentrations.

Illustrative pre-combustors suitable for use with the systems and methods described herein are provided in U.S. Pat. Nos. 5,250,489 and 5,512,250, each of which is hereby incorporated by reference herein in their entirety. For example, the pre-combustor may be a platinum-group, metal-based catalyst on a metal support. The metal support may be assembled, e.g., from or fabricated from metallic materials having a catalytic surface and an adjacent non-catalytic surface. In this way, when rolled into a spiral monolith, some channels will have a catalytic material, while other channels will not.

Metallic supports may be in the form of honeycombs, spiral rolls of corrugated sheet (which may, for example, be interspersed with flat separator sheets), columnar (or "handful of straws"), or other configurations having longitudinal channels or passageways permitting high space velocities with a minimal pressure drop. Metallic supports are typically more desirable than ceramic supports, but ceramic supports may be used as well. The catalytic material is deposited, coated, impregnated, or otherwise placed, on at least a portion of the inner walls of the longitudinal channels (i.e., within the metal supports' channels or passageways). By the phrase "at least a portion" it is meant that each channel need not be coated along its entire length, or over the entire channel surface at any location along it length. In some instances catalyst deposition along a portion of the length of the channel will be sufficient. Exemplary metallic support materials include, for example, aluminum, aluminum-containing or aluminum-treated steels, ferrous alloys, certain stainless steels, any high temperature metal alloy, including nickel or cobalt alloys where a catalyst layer can be deposited on the metal surface. Exemplary aluminum-containing steels suitable for use with the pre-combustors described herein are those found in U.S. Pat. No. 4,414,023 to Aggen et al. U.S. Pat. No. 4,331,631 to Chapman et al., and U.S. Pat. No. 3,969,082 to Cairns et al. These steels, as well as others sold by Kawasaki Steel Corporation (RIVER LITE 20-5 SR), Allegheny Ludlum Steel ALFA I AND II, and Engineered Material Solutions DURAFOIL, contain sufficient dissolved aluminum so that, when oxidized, the aluminum forms alumina whiskers, crystals, or a layer on the steel's surface to provide a rough and chemically reactive surface for better adherence of a washcoat.

The pre-combustor support may further comprise a washcoat. The washcoat may be applied using an approach such as is described in the art, e.g., the application of gamma-alumina, zirconia, silica, or titania materials (preferably sols) or mixed sols of at least two oxides containing aluminum, silicon, titanium, zirconium, and additives such as barium, cerium, lanthanum, chromium, or a variety of other components. For better adhesion of the washcoat to the support, a primer layer can be applied containing hydrous oxides such as a dilute suspension of pseudo-boehmite alumina as described in U.S. Pat. No. 4,229,782 to Chapman et al. The primed surface may be coated with a gamma-alumina suspension, dried, and calcined to form a high surface area adherent oxide layer on the metal surface. In some variations, zirconia sol or suspension is used as the washcoat. Other refractory oxides, such as silica and titania, are also suitable. The washcoat may be applied by any suitable method, e.g., by spraying, by direct application, by dipping the support into a sol of the washcoat material, etc. The catalyst for combustion or reforming can be applied after the washcoat has been coated on the support, or it can be added to the washcoat and applied to the support in a single step.

Aluminum supports are also suitable for use with the pre-combustors described herein and may be treated or coated in essentially the same manner as described above for the general metallic supports. The pre-combustors may be made by cold rolling or otherwise processing a long sheet or strip of metal to corrugate it. This corrugated strip may be combined with a flat metal strip and rolled in a spiral to form a cylindrical catalyst structure through which gas can flow. Rather than rolling, the corrugated and flat (or spacer) strips can be cut or folded and placed together to form structures. Alternatively, Chapman et al. in U.S. Pat. No. 4,331,631 teaches the use of a herringbone corrugation pattern, which when folded or doubled and rolled into a spiral, will form an open corrugated structure without the use of a flat metal strip and will not nest.

The pre-combustor can be of any suitable size, as long as it remains configured to provide the desired function (e.g., to provide a substantially uniform fuel air mixture at the inlet of the fuel combustor, to heat up a downstream fuel combustor, to help provide a rich reducing mixture, etc.). For example, it can be in the range of about 0.05 to about 1 times the volume of the fuel combustor. In some variations the pre-combustor is about 0.1 to about 0.7 times the volume of the fuel combustor, and in other variations, the pre-combustor is about 0.2 to about 0.4 times the volume of the fuel combustor. Similarly, the pre-combustor can have passages or channels of any suitable hydraulic diameter. Typically, the channel hydraulic diameter of the pre-combustor is larger than the channel hydraulic diameter of the fuel combustor, but it need not be. The hydraulic diameter ($D_h$) is defined as the quantity that is four times the average cross-sectional area of all of the channels of a particular type, e.g., catalyst-coated channels, in the catalyst structure divided by the average wetted perimeter of all of the channels of that type in the catalyst structure. The hydraulic diameter is typically equal to the geometric diameter in the case of circular channels, but will vary in the case of non-circular channels. In this way, the geometry of the channels is accounted for. The hydraulic diameter of the catalyst coated channels can be different from the hydraulic diameter of the non-coated channels. In some variations, the hydraulic diameter of the pre-combustor channels is in the range of about 0.2 mm to about 10 mm. In other variations, the hydraulic diameter of the pre-combustor channels is in the range of about 0.5 mm to about 7 mm, or about 1 mm to about 5 mm. The pre-combustor may also be electrically heated, or configured to be heated by the passage of an electrical current therethrough.

B. Optional Mixers

Figure 2:
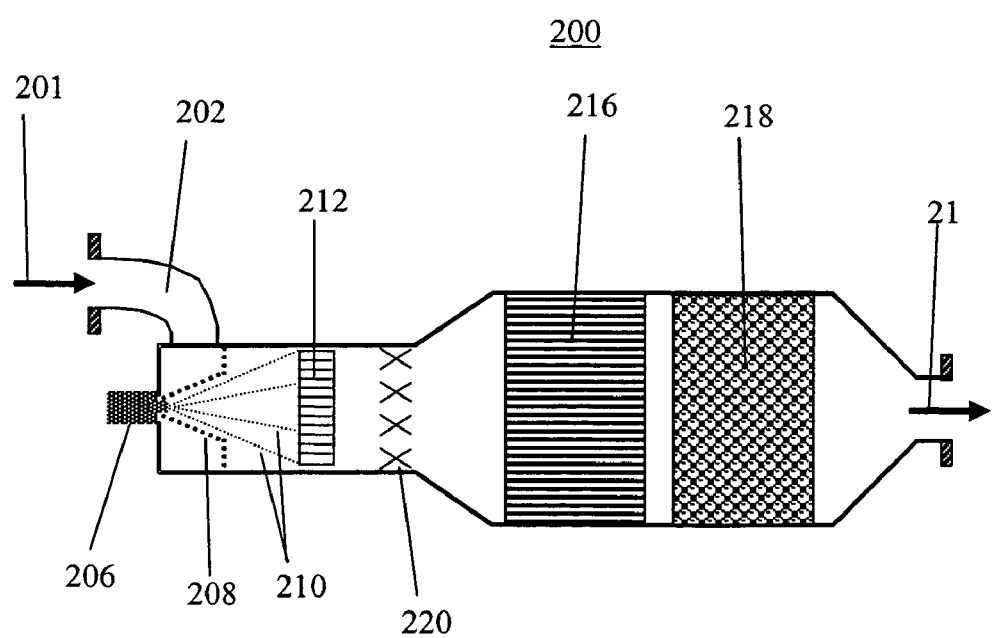
FIG. 2 illustrates an exemplary system having a perforated plate and a downstream trap or filter.

The system may further comprise a mixer located upstream of the fuel combustor, or upstream of the pre-combustor, to help facilitate mixing of the injected fuel with the air from the exhaust stream. The mixer may thus help to produce a more uniform fuel air mixture. For example, shown in FIG. 2, is a mixer (220) located downstream of pre-combustor (212). However, the mixer (220) may be located upstream of the pre-combustor (212) as well.

The fuel to be injected may take the form of a vapor, a liquid, or a combination of the two. If the injected fuel is a liquid, then some or all of it may be vaporized when contacted by the hot exhaust gas mixture. In the case of diesel fuel, a substantial portion of the fuel will be in the form of liquid droplets, and at low exhaust temperatures, these droplets will not evaporate rapidly. In these variations, the pre-combustor may be especially useful in vaporizing a substantial portion of the injected liquid fuel. Mixing may also be used to further accelerate this vaporization. The mixer may be any suitable mixer that promotes mixing of gases and/or aids the vaporization of liquid droplets.

In one variation, a static (i.e., having no moving parts), in-line mixer is used. In this variation, the mixer acts by changing the flow of the exhaust stream and injected fuel, causing mixing. Various types of static mixers are commercially available and may be used. For example, one type of static mixer has an array of intersecting channels that split the stream into portions, which portions are then rearranged and combined. Other types of mixers include swirlers and counter rotating swirlers, which impart a swirl to the gas mixture. The swirler may have a portion rotating in one direction and another portion rotating in the opposite direction. Pipe sections may also be used as mixers. For example, straight pipe sections with a length/inner diameter ratio ($L/D_i$) greater than 2, or bent pipe sections may be used.

Alternatively, the mixer may have moving parts such as fans, turbines, or acoustic energy input devices, which induce turbulence or mixing within the gas streams. Such mixers may be less desirable, however, since the moving parts may wear and require service and may also require a greater energy input. Accordingly, it may be desirable to evaluate any improvement in mixing efficiency before determining whether a non-static mixture is sufficiently advantageous to tolerate the additional design complexity and energy consumption.

Sometimes varnish or carbonaceous deposits form on the mixer parts that are in contact with fuel spray, especially if the fuel has a high molecular weight and is prone to pyrolysis. Varnish is a hydrocarbon like coating formed by partial pyrolysis of the diesel fuel. Accordingly, at least a part of the mixer may be coated with a catalyst capable of catalyzing an oxidation reaction to oxidize these varnish or carbonaceous deposits. In this way, the catalyst prevents or removes the deposits, much like a continuous-cleaning or self-cleaning oven.

Fuel injectors may also be used to help with mixing. In one variation, fuel injectors are located upstream of a fuel combustor and are used in combination with a length of pipe to mix the gas mixture uniformly. The section of pipe length necessary to perform this function is generally thought to be about two to about ten times the pipe diameter length. The fuel injectors may also be located upstream of a bend in the exhaust pipe to further mix the fuel and air. In some instances, it may be desirable to mix the fuel and air quickly or within a short distance prior to introduction into the pre-combustor. This is because heavy fuels (e.g., diesel fuels) are prone to pyrolysis or decomposition and produce varnish or other deposits, which may in turn lead to the degradation of the system.

Similarly, one or more perforated plates or screens may be used to mix the exhaust stream and injected fuel mixture, or to direct the mixture flow in a desired direction, as shown in FIG. 2. Shown there is system (200) comprising an exhaust stream (202), fuel injector (206), pre-combustor (212), fuel combustor (216), and a filter or trap, for example, a DPF or $NO_x$ trap (218). Perforated plate (208) is located upstream of fuel injector (206) to help make the exhaust stream fuel mixture more uniform and to help direct the flow onto pre-combustor (212). Any number of perforated plates may be used, and the use of additional perforated plates is thought to increase the mixture uniformity. However, the use of additional perforated plates may result in an increase pressure drop, which may be undesirable since it could reduce engine output power.

C. Fuel Combustor/Fuel Processor

As mentioned above, it should be understood that when reference is made herein to the term fuel combustor that such term is meant to include a fuel processor. Whereas a fuel combustor combusts fuel under lean conditions, a fuel processor combusts fuel to essentially consume oxygen in the exhaust stream and to reform the remaining fuel and produce a reducing gas mixture containing $H_2$ and CO. However, a fuel combustor and a fuel processor both combust fuel and, therefore, references to a fuel combustor are intended to cover both.

As shown in FIG. 1, the fuel combustor (110) comprises an inlet (112), an outlet (114) and a catalytic material (not shown). In addition, the fuel combustor defines at least one lumen adapted for the passage of gas therethrough. The fuel combustor (110) may also comprise a second fuel injector for the introduction of air or additional fuel (not shown) therein. The system may also comprise a control system (not shown).

The catalytic material of the fuel combustor may comprise a single catalyst or may comprise several catalysts in series. For example, a first catalyst may be designed primarily as an oxidation catalyst with a catalyst composition selected to react with some of the fuel and oxygen to form carbon dioxide and water and to generate heat. Excess fuel and/or fuel injected between catalyst units could then pass to a second catalyst unit where the excess fuel could react with water and carbon dioxide to form CO and $H_2$. This second catalyst may be designed primarily as a reforming catalyst for example. Alternatively, a single catalyst can be designed having an inlet section for oxidation and an outlet section for reforming. In this way, a single catalyst is provided that effectively functions as two separate catalyst units.

The catalytic material may comprise one or more metals or oxides as the active catalyst combined with a high surface area refractory support, many of which are well known in the art for oxidation of hydrocarbons. The catalytic material may be applied as a washcoat, a porous coating typically comprising a mixture of a high surface area support and active catalyst elements. Alternatively, the washcoat may comprise a support with a porous structure that has a second oxide portion or a mixture of oxides active for the oxidation of hydrocarbons or carbon. The coating may be applied using any number of processes. For example, it may be applied using plasma flame spraying, chemical vapor deposition, electroplating, electroless plating, or by application of a sprayable sol (comprising a suspension of the catalyst particles in a liquid). The washcoat may also be applied by dipping the parts into a slurry. One example of a catalyst composition that may be used with the present invention is described in U.S. Pat. No. 5,232,357 by Dalla Betta et. al., which is hereby incorporated by reference in its entirety.

The catalytic material of the fuel combustor may comprise pellets or beads in a container, or may comprise a monolithic honeycomb type unit. A monolithic honeycomb unit may be desirable because vehicle vibration may cause abrasion and loss of pellet or bead material. Additionally, monolithic units typically have a lower pressure drop for the flowing exhaust stream. Any monolith may be used. For example, the monolith may be ceramic or may be metal and may have a variety of cell sizes and shapes. Determination of the cell size and shape is typically dependent on the desired surface area and pressure drop, as well as the relevant heat and mass transfer coefficients. For example, it may be desirable that the fuel processor catalyst have a low heat capacity so it can heat up quickly. Similarly, it may be desirable that the fuel processor catalyst have a low pressure drop so that the overall pressure drop of the entire system does not present a hindrance to operation or reduce the efficiency of the engine.

When a monolithic structure is used for the catalyst substrate, its external or wall surfaces may be coated with a layer of catalyst. This washcoat may comprise a porous inert oxide such as alumina or zirconia and have a highly exposed surface area. This oxide washcoat may contain additional components active for oxidation or reforming depending on the desired function. Preparation and composition of various monolithic catalysts for use with the present invention are described in U.S. Pat. Nos. 5,183,401, 5,259,754, and 5,512,250 to Dalla Betta et. al., each of which are hereby incorporated by reference in their entirety.

The oxidation catalyst may comprise any catalyst capable of oxidizing hydrocarbons. For example, the oxidation catalyst may comprise elements selected from any of Groups VI, VII, VIII and IB of the periodic table of the elements. The more active catalytic elements may be selected from the group Pd, Pt, Ir, Rh, Cu, Co, Fe, Ni, Cr, and Mo. In some instances, it may be more desirable to use Pd, Pt, Rh, Co, Fe, or Ni, which may be used separately or in combination and may further exist as the element or the oxide in actual use.

One property of the oxidation catalyst that may be desirable is that it has good catalytic activity at very low temperatures. In this way, oxidation can be initiated at low exhaust temperatures without modification of the system design. This property is often referred to as light off temperature, or the temperature at which the fuel and oxygen in the exhaust reacts at a sufficient temperature for the gas temperature to rise significantly. A light off temperature below 250° C., and usually below 200° C., is typically desirable.

The oxidation catalyst may be deposited on washcoats comprising aluminum oxide, silicon oxide, zirconium oxide, or mixtures and combinations thereof, or mixtures or combinations thereof with additional components or elements. Examples are cerium zirconium oxide mixtures or solid solutions, silica alumina, Ca, Ba, Si, or La stabilized alumina, as well as other supports well known in the art. Since diesel fuel with a high molecular weight has a propensity to pyrolyze at high temperatures, the catalyst may also contain catalytic components active for steam cracking of the hydrocarbon fuel. Possible additives may include basic oxides such as calcium oxide, barium oxide, other alkali or alkaline earth oxides and rare earth oxides. The catalyst can be made by coating or impregnating Pd, Pt or any other active catalyst within a porous support such as alumina or zirconia. The metal loading could be in the range of 0.1 to 20% by weight, and more desirably, in the range of 1 to 10% by weight. Several illustrative catalysts that may be used with the present invention include those described in U.S. Pat. No. 5,232,357 to Dalla Betta et. al., which is hereby incorporated by reference in its entirety.

The reforming catalyst may similarly use a high surface area support with added active components. For example, the reforming catalyst may comprise components Ni, Rh, Pd, Pt. The catalyst may be selected so that it is capable of remaining stable under normal lean oxidizing conditions and then responding very quickly to the addition of fuel under rich conditions so that $H_2$ and CO are thereby produced. In this respect, it may be desirable to use Pt, Pd and Rh supported on a porous oxide support.

For example, a typical reforming catalyst may comprise 1% Rh by weight supported on a porous zirconium oxide support. This may be accomplished by dissolving rhodium trichloride in water and then impregnating the solution onto a solid zirconium oxide support having a high surface area (e.g., ranging from 15 to 150 m$^2$/g). The rhodium concentration may typically be in the range of 0.1 to 20% by weight of the total washcoat catalyst solid. More typically, the rhodium concentration may be in the range of 1 to 10% of the total washcoat loading. The washcoat may be coated onto the interior channels of a monolithic honeycomb structure at a loading thickness of 1 to 50 mg/cm$^2$ or more typically, in the range of 5 to 15 mg/cm$^2$. Pd or Pt catalysts may be prepared in a similar manner.

The oxidation and reforming catalysts may be combined in the same monolithic unit by combining in the washcoat both the oxidation and reforming components. For example, the active oxidation catalyst Pd and the active reforming catalyst Rh may be combined on a zirconia support to form a catalyst having the oxidizing activity to react the fuel with the oxygen and the reforming activity necessary to reform the remaining fuel to CO and H$_2$. Alternatively, the Rh component may be added to a high surface area support and calcined or fixed. Separately the Pd may be coated onto a high surface area support and calcined or fixed. These catalysts may also be mixed together to form a Pd/Rh catalyst and this mixed catalyst then coated onto the monolithic substrate.

D. NOx Trap

The systems described herein may further comprise a NO$_x$ trap. The NO$_x$ trap may be used in combination with a pre-combustor, a fuel combustor, a DPF, or some combination of the three. NO$_x$ traps typically comprise an adsorbent-catalyst structure (e.g., a canister), which are placed in the exhaust stream and enable the exhaust stream to flow therethrough. Typical catalysts are honeycomb like, monolithic structures having the adsorbent and catalyst components coated onto their surfaces or walls.

As noted above, when the adsorbent in the catalyst becomes saturated with NO$_x$, the adsorption becomes less complete and the NO$_x$ level exiting the NO$_x$ trap begins to increase. At this point, the composition of the exhaust stream is changed from an oxidizing to a reducing state, and the reduction cycle begins. A reducing agent is introduced, and the NO$_x$ is desorbed from the adsorbent and is reduced to nitrogen by the catalytic components of the NO$_x$ trap. FIG. 2 shows one illustrative variation in which filter or trap (218) may be a NO$_x$ trap, which is located downstream of fuel combustor (216).

E. DPF

The systems described herein may further comprise a DPF. The DPF may be used in combination with a pre-combustor, a fuel combustor, a NO$_x$ trap, or some combination of the three. FIG. 2 shows one illustrative variation in which filter or trap (218) may be a DPF, which is located downstream of fuel combustor (216). The DPF may be made of cordierite, silicon carbide, metal or any other material with a design that will trap and remove particulate soot from the exhaust flow. A typical DPF is a ceramic flow through honeycomb structure with porous channel walls and alternate channels plugged at the outlet and inlet so that the gas flow is directed to flow through the walls whereby the particulate material is filtered from the exhaust flow. Other designs are possible. However, in all such designs, the particulate soot is trapped within the filter and with time can plug the filter resulting in increased backpressure and thus requiring regeneration by combustion of the trapped soot. The DPF may also be a simple ceramic or metal filter in which regeneration is accomplished by heating the filter in the presence of an oxygen containing exhaust flow, to a temperature at which the soot combusts.

Alternatively, oxidation of the soot may also be accomplished with the aid of a catalyst applied to the filter surface. This can act to lower the soot combustion temperature so that regeneration will occur at lower temperatures. The catalyst on the DPF can be designed to also combust diesel fuel and as such, act as the fuel combustor. Generally this is undesirable since if this combustion occurs non-uniformly, severe local overheating can occur and thermal gradients may be generated that can crack or otherwise damage the DPF. However by positioning a pre-combustor between the fuel injector and the DPF, the fuel concentration may be sufficiently uniform so that direct combustion on the DPF would provide good durability. Thus, an alternative system design is one in which the system consists of a fuel injector, a pre-combustor, a mixing region and a DPF containing a catalyst on the filter surface.

F. Thermal Mass

A thermal mass, or heat absorbing component, may be used to help control the system operation, and in particular, to help moderate the temperature between a fuel combustor and a NO$_x$ trap. This may be useful, because while the optimal operating temperature range for the fuel combustor might be quite high, the optimal operating temperature range for the NO$_x$ trap might not be, because, e.g., a NO$_x$ trap may perform best at lower temperatures and could be deactivated at high temperatures.

Figure 3:
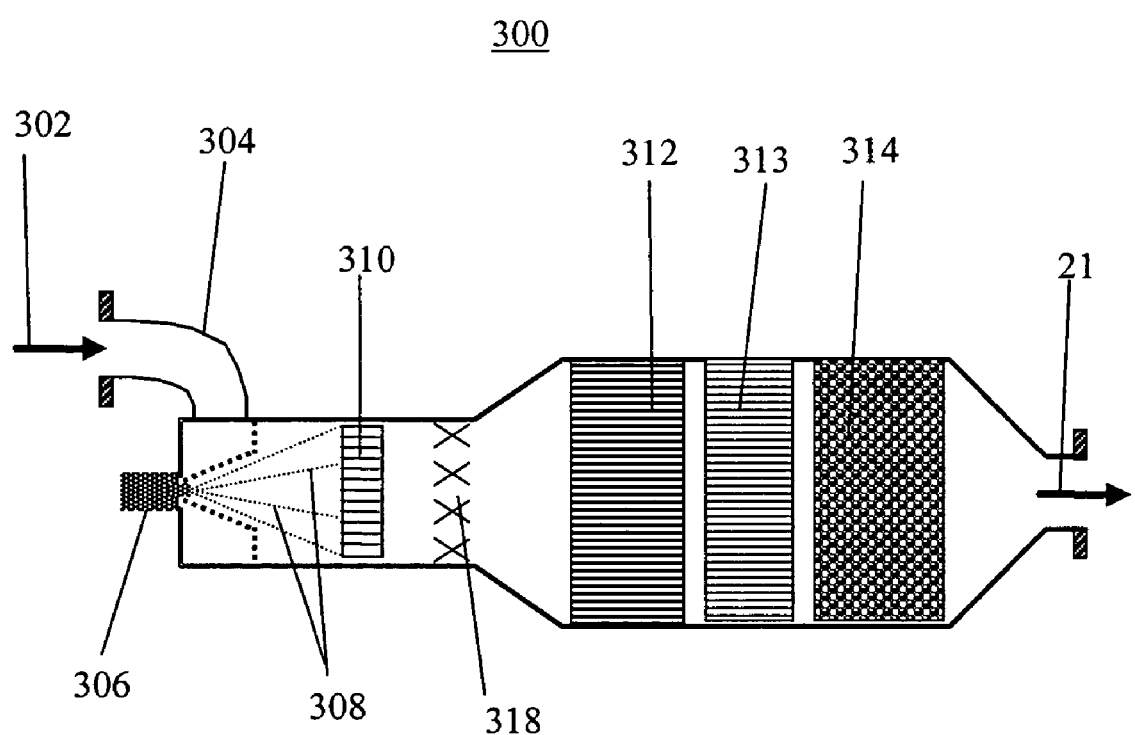
FIG. 3 illustrates an exemplary system described herein.

Any number of thermal mass configurations are possible for use with the systems described here and any number of thermal masses may be employed. One example of a system configuration with a thermal mass and a NO$_x$ trap is shown in FIG. 3. Shown there is fuel processor (312) located downstream of pre-combustor (310), and thermal mass (313) located downstream of fuel processor (312) and upstream of NO$_x$ trap catalyst (314). During regeneration, the fuel processor (312) may increase to a temperature of 600° C. or more. The exhaust gas will pass through the thermal mass (313) and will be cooled by heat exchange with the thermal mass, thus limiting the exposure of the NO$_x$ trap (314) to a high temperature exhaust. The thermal mass (313) may be a ceramic or metallic honeycomb structure with sufficient heat capacity to limit the heating of the NO$_x$ trap catalyst.

This thermal mass may be a DPF or soot trap placed between the fuel combustor and NO$_x$ trap, or may be a separate thermal mass component as shown in FIG. 3. When a soot trap or a DPF is placed between the fuel combustor and the NO$_x$ trap, the NO$_x$ trap may be more easily maintained at a constant temperature. One advantage of this design is that the heat generated by the fuel combustor may be used to heat up and regenerate the DPF by helping to burn off the carbonaceous soot, as described in more detail below.

The thermal mass may be made of any suitable material. For example, it may be ceramic or it may be metal. In some variations, it has a high heat capacity and a low pressure drop to ensure that the pressure drop across the entire system does not hinder system operation. The optimal range of thermal mass is a function of at least the gas flow rate and the desired temperature rise, and thus may be selectively controlled. In another variation, the NO$_x$ trap itself may be designed with a high heat capacity.

II. Methods

A. Methods for Regenerating a NO$_x$ Trap

Also described here are methods for regenerating a NO$_x$ trap or a DPF, which are placed in fuel injected exhaust streams. In general, the methods for regenerating a NO$_x$ trap comprise the steps of injecting fuel into an exhaust stream upstream of a pre-combustor, optionally mixing the exhaust stream with the injected fuel, passing the exhaust stream and fuel mixture through the pre-combustor, operating the pre-combustor to at least partially combust the injected fuel, reacting the fuel and exhaust stream mixture within a fuel combustor to generate a reducing gas mixture comprising CO and $H_2$, and introducing the reducing gas mixture into a $NO_x$ trap located downstream of the fuel combustor.

For example, as shown in FIG. 3, exhaust from an upstream engine (302) enters duct (304) of system (300). Fuel injector (306) injects fuel (308) into the exhaust flow directed to the inlet face of pre-combustor (310). The exhaust stream air mixture then flows into pre-combustor (310) where the pre-combustor partially combusts the injected fuel and reduces the amount of oxygen that flows into fuel combustor (312). The fuel and exhaust mixture then flows into the fuel combustor (312), where a portion of the fuel reacts with oxygen, while the remaining fuel reacts with water and $CO_2$ to form CO and $H_2$ by processes well known in the art.

The $H_2$ and CO then flow out of fuel combustor (312) and downstream to the optional thermal mass (313) and $NO_x$ trap (314). Since the gas mixture comprises a $H_2$ and CO reducing gas mixture, containing little or no oxygen, the $NO_x$ trap unit will be rapidly and efficiently regenerated and the adsorbed $NO_x$ reduced to $N_2$. At the completion of this regeneration cycle, the fuel injection is terminated and the system returns to adsorption mode.

This reaction generally occurs with sufficient speed so that the reduction cycle is relatively short while at the same time permits sufficient time to elapse so that a significant fraction of the $NO_x$ adsorption capacity is regenerated. The exhaust composition then reverts back to its normal oxidizing condition, and the entire cycle is repeated. Typically, the adsorption cycle lasts anywhere from 1 to 5 minutes at high load and possibly as high as 20 minutes at low load or idle. The regeneration-reduction cycle typically lasts 1 to 10 seconds and sometimes even longer depending on the time required to regenerate the $NO_x$ trap.

The injected fuel (308) may be any fuel compatible with the system. For example, it may be the same type of fuel as used in the engine. When the fuel is a liquid, such as diesel fuel or gasoline, the exhaust gas mixture may not be hot enough to vaporize the fuel completely. The fuel may be injected either continuously or intermittently, for the duration of the regeneration cycle. In the case of continuous fuel injection, the rate and duration of the fuel flow controls the fuel quantity. In the case of intermittent fuel injection, the pulse frequency and pulse duration controls the fuel quantity.

The injection of the fuel in several discrete rich and lean pulses may be advantageous, for example, when the systems described herein are used with exhaust streams containing high levels of oxygen, as described in Applicant's copending U.S. patent application Ser. No. 10/309,936 filed on Dec. 3, 2002, which a sections describing the pulsed injection of fuel are hereby incorporated by reference in their entirety. For example, with exhaust streams containing 5-20% oxygen, and more often with exhaust streams containing from 8 (±2%) to 15% (±2%) oxygen pulsed fuel injection may be used to generate rich cycles for the regeneration of $NO_x$ trap catalysts. The pulses may be of any duration, but should be sufficiently short so as not to overheat the fuel processor catalyst, and should have sufficient duration between rich pulses to allow the fuel combustor time to cool down. If the fuel pulses are too long, the catalytic material in the fuel combustor may overheat, since high levels of oxygen, when fully combusted, result in a large heat release.

Any number of pulses may be used, for example, 1 to 20 pulses, or 5-10. Similarly, the length of each pulse may be selected so that the catalyst temperature will remain high during the pulsing series, but will not become high enough so as to cause the catalyst to overheat. For example, the pulses could be from 0.1 to about 2 seconds in length. In addition, the time interval between pulses may be varied depending on the mode of engine operation, and the design of the fuel processing catalyst and the exhaust flow rate being treated. At low engine rpm where the exhaust flow rate is low, the pulses can be farther apart since the lower gas flow rate cools the catalyst more slowly. The pulses may be from 0.5 second to 20 seconds apart. At higher rpm where the exhaust flow rate is higher, the pulses may be closer together, from 0.1 to 3 seconds apart. This is often made possible by the use of a pressurized fuel injector, which may be electronically controlled, that enables the fuel injection to be controlled at frequencies of up to 200 Hz. The quantity of fuel injected is typically sufficient to react with all of the excess oxygen present in the exhaust stream and to generate the required amount of reducing gas mixture (CO and $H_2$) at the operating temperature of the $NO_x$ trap catalyst system. This quantity of fuel corresponds to an equivalence ratio ($\phi$) greater than 1.

Fuel is generally not injected during the $NO_x$ adsorption phase, which typically lasts 1 to 5 minutes at high loads and longer at low load or idle. Then fuel is injected again for about 1 to 10 seconds during the $NO_x$ regeneration-reduction phase, and the cycle is repeated as long as the engine is operating and is producing $NO_x$. The quantity and timing of fuel injection may be optionally controlled by a fuel processor control system, which may be linked to or be part of, the engine management system or engine control unit.

As noted above, mixers (318) may be used to help produce a more uniform fuel air mixture, or a mixture having a resulting equivalence ratio ($\phi$) within any desired limit. The equivalence ratio is the fuel concentration divided by the theoretical fuel concentration needed to fully react with all the oxygen present in the gas mixture to form $CO_2$ and $H_2O$. For example, if the pre-combustor, and fuel combustor are to be used to reduce the oxygen concentration in the exhaust to zero (e.g., before it enters a $NO_x$ trap), then the level of mixing will determine the required mixture equivalence ratio. If the mixer produces a mixture at the fuel combustor inlet of +/−10% uniformity then fuel may be added to give an equivalence ratio of 1.1 so that the lowest equivalence ratio at the catalyst is 1.0. Similarly, for the portion of the fuel combustor operating rich to produce $H_2$ and CO, the mixture uniformity will likely be determined by the required equivalence ratio and the required temperature to obtain the necessary reforming performance. In general, mixture uniformity from +/−20% is desirable, while +/−10% is more desirable, and +/−6% is most desirable.

The $H_2$ and CO reducing agent can be formed by a variety of reactions. For example, a portion of the fuel may be combusted on the pre-combustor to raise the fuel combustor temperature to approximately 500° C. to 700° C., while the remaining fuel reacts with $H_2O$ and $CO_2$ in the exhaust stream or formed by the initial fuel combustion to produce the desired $H_2$ and CO. Alternatively, the fuel, $O_2$, $H_2O$, and $CO_2$ can react simultaneously within the fuel combustor to yield the desired $H_2$ and CO.

In some situations, it may be desirable that the $NO_x$ trap not be heated too high in temperature since this may damage it or drive it out of its desired operating range for adsorption.

As described above, this may be accomplished by placing a thermal mass downstream of the fuel combustor. Alternatively, a thermal mass may be placed downstream of the fuel combustor to absorb the heat from the fuel combustor outlet stream and to reduce the gas stream temperature prior to entering the $NO_x$ trap.

B. Methods for Regenerating a DPF

Methods for regenerating a DPF are also described. In general, the methods comprise the steps of injecting fuel into an exhaust stream located upstream of a pre-combustor, optionally mixing the exhaust stream with the injected fuel with at least one mixer, passing the exhaust stream and fuel mixture through the pre-combustor, operating the pre-combustor to increase the temperature of the injected fuel and exhaust stream mixture, reacting the injected fuel and exhaust stream mixture within a fuel combustor to further increase the temperature of the injected fuel and exhaust stream mixture, and introducing the injected fuel and exhaust stream mixture with the increased temperature into a diesel particulate filter located downstream of the fuel combustor, whereby the diesel particulate filter is regenerated. Pre-combustors, mixers, fuel injectors, and fuel combustors were described in detail above, and as with the above described systems and methods, the exhaust stream may comprise compression ignition engine exhaust or may comprise spark ignited engine exhaust.

The injected fuel typically comprises hydrocarbons, for example, gasoline or diesel fuel. In some variations, the fuel is vaporized prior to injection. Typically, the fuel is injected at a flow rate that obtains the required or desirable exhaust temperature for regeneration of the DPF. In some variations, the injection of fuel is pulsed.

The methods of regenerating a DPF can also include a step of electrically heating the pre-combustor. In these instances, the pre-combustor may have a source of electric energy, which is input to part or all of the pre-combustor to raise the pre-combustor temperature and to allow combustion to occur at exhaust temperatures where the fuel would normally not combust.

C. Methods for Generating a Substantially Uniform Fuel Air Mixture at a Fuel Combustor Inlet As described above, it is often desirable to have a substantially uniform fuel air mixture at a fuel combustor inlet, for example, in order to help minimize large undesirable variations and to prevent damage to the fuel processor. A second desire is to produce a reducing agent such as $H_2$ and CO without a substantial amount of $O_2$ at the fuel processor outlet. That is, as noted above, oxygen will react with the reducing agent, and will thus decrease its reducing capacity and its effectiveness in regenerating a downstream $NO_x$ trap. Accordingly, methods for generating a substantially uniform fuel air mixture at a fuel combustor inlet are provided here. Typically, these methods comprise the steps of injecting fuel into an exhaust stream located upstream of a pre-combustor, where the exhaust stream comprises air, passing the exhaust stream and fuel mixture through the pre-combustor and operating the pre-combustor to produce a substantially uniform fuel air mixture at an inlet of a fuel combustor. In some variations, the methods further comprise the step of mixing the exhaust stream with the injected fuel with at least one mixer. Mixers, pre-combustors, and fuel combustors were described in detail above.

The uniformity of the fuel air mixture at the fuel combustor inlet may be determined in any number of ways. For example, samples from various points in the exhaust flow plane at the fuel combustor inlet may be withdrawn through small access ports (e.g., using a syringe) and then analyzed for composition (e.g., using gas chromatography). The composition of the mixtures may then be compared. The fuel air mixture is substantially uniform if, for example, the compositions are +/−20% uniform or less. Accordingly, when reference is made to the term uniformity, it should be understood that spatial uniformity is being described.

Similarly, because temperature after combustion or after complete fuel processing to reductant $H_2$ and CO is related to the fuel air mixture concentration, temperature measurements may also be taken in order to measure substantially uniformity of a fuel air mixture. These temperature measurements should be taken at the fuel combustor outlet during operation in lean combustion mode or in rich fuel processing mode. Exemplary methods for determining substantial uniformity in temperature are described below.

D. Methods for Generating a Substantially Uniform Temperature at a Fuel Combustor Outlet Methods for generating a substantially uniform temperature at a fuel combustor outlet are also provided. For example, in the case of DPF regeneration, it may be desirable to provide a substantially uniform temperature at the DPF inlet so the DPF is not overheated, unduly stressed, or otherwise damaged. Determining the uniformity of the temperature of the gas entering the DPF may be done in a number of ways. For example, it may be done by measuring the temperature of the gas exiting the fuel combustor (i.e., at the outlet of the fuel combustor), measuring the temperature of the gas entering the DPF (i.e., at the DPF inlet), or by measuring the temperature of the gas flowing between the fuel combustor outlet and the DPF inlet.

Physical temperature measurement may be accomplished using thermocouples. For example, the temperature of gas flowing between the fuel combustor outlet and DPF inlet may be measured by placing several thermocouples (e.g., 4 to 6) immediately downstream of the fuel combustor outlet and then measuring the temperature at each thermocouple. Similarly, a single thermocouple may be used and scanned over the area of the fuel combustor outlet to measure temperature in a number of locations. When the temperature does not vary by more than +/−100° C. (i.e., form the highest temperature to the lowest temperature at the catalyst outlet), then the temperature may be assumed to be substantially uniform. In some variations, this variance is +/−75° C., or +/−50° C.

E. Methods for Facilitating $NO_x$ Trap Desulfation

Methods for facilitating the desulfation of a $NO_x$ trap are also provided. Sulfur in engine fuel produces sulfur oxides (e.g., $SO_2$ or $SO_3$) in the exhaust stream. These sulfur oxides ("$SO_x$") can react with the components of the $NO_x$ trap to form sulfates, which in turn can deactivate it. While typical levels of sulfur in fuel are relatively low, making the deactivation of the trap take anywhere from hours to weeks (corresponding to 100's to 1000's of miles of engine usage), the trap must be able to work far longer than this.

One method of desulfation of the system is accomplished by operating the fuel combustor to produce an outlet gas stream having a temperature in the range of about 500° C. to about 800° C. This stream may then be used to heat a downstream $NO_x$ trap to a temperature in the range of about 500° C. to about 700° C. When the $NO_x$ trap is heated to a desired temperature, the fuel flow to the fuel combustor and the engine throttle may be adjusted to produce $H_2$ and CO and to reduce the oxygen concentration exiting the fuel combustor. This reducing gas mixture will then desulfate the $NO_x$ trap by decomposing the sulfates and other species that have caused its deactivation. This hot reducing gas mixture can be maintained until the regeneration is complete. In one variation, the regeneration temperature range for the $NO_x$ trap is from about 300° C. to about 800° C. and more typically, from about 500° C. to about 700° C. In addition, the $H_2$ and CO reducing agent can be fed to the $NO_x$ trap for regeneration as a continuous long reducing pulse or as many short pulses.

F. Control Strategies

A control processor or a control system may be used with the systems and methods described herein, and any number of control strategies may be employed. For example, a map of $NO_x$ output versus engine operating conditions, such as load or speed, can be contained in the control system and used to estimate the cumulative $NO_x$ generated by the engine and passed through the $NO_x$ trap. In this way, the $NO_x$ collected by the $NO_x$ trap may be estimated and as the trap reaches capacity, the $NO_x$ regeneration cycle may be initiated. Alternatively, a $NO_x$ sensor may be placed downstream of the $NO_x$ trap. In this way, once the sensor perceives that the $NO_x$ trap has reached capacity (e.g., by measuring breakthrough $NO_x$ levels), the regeneration cycle may be initiated.

Similarly, a control system may be used to monitor and control any or all system temperatures. Illustrative temperatures that may be controlled include inlet and outlet gas mixture temperatures, fuel input temperature, and catalyst temperature. For example, the reformer catalyst temperature may be monitored and controlled via a thermocouple or other temperature-sensing device placed near the outlet of the catalyst.

In a like manner, the temperature at the outlet of the fuel combustor can be measured and monitored using a thermocouple. The temperature may be controlled by adjusting the fuel flow to the fuel combustor while leaving the oxygen level in the exhaust constant. Alternatively, the temperature may be controlled by keeping the fuel flow to the fuel combustor constant while adjusting the oxygen level, for example, by throttling the engine. Yet another alternative is to adjust both the fuel flow to the fuel combustor and the $O_2$ level. This would allow the system to control both the fuel processor outlet temperature, and the equivalence ratio. In this way, the level of $H_2$ and CO may be effectively controlled.

The fuel combustor temperature may be monitored by measuring the gas temperature at the outlet or by measuring the actual temperature of the catalytic material itself. To minimize fuel usage by the fuel combustor, a combustibles sensor, or $H_2$ or CO sensor may be placed downstream of the $NO_x$ trap to sensor the breakthrough of $H_2$ and CO reducing agent. This in turn signals the control system to stop the regeneration cycle.

If the fuel combustor is used to desulfate the $NO_x$ trap, then it may be desirable to measure the temperature at the outlet of the fuel combustor to limit the operating temperature to insure durability. In addition, the temperature at the outlet of the $NO_x$ trap may be measured to ensure that the NO unit is at the desired temperature for regeneration. In addition, the temperature of the fuel combustor may be modulated to obtain the desired temperature of the $NO_x$ trap for proper desulfation.

A control system may also be used to control the equivalence ratio. For example, when $H_2$ and CO are to be generated by the fuel combustor, the equivalence ratio used with the reformer catalytic material can be controlled by changing the fuel flow or by throttling the airflow to the engine. More specifically, at normal operating engine airflow, fuel may be added to the reformer catalytic material until the temperature is within the range required for reforming the fuel to $H_2$ and CO. At this point, the engine airflow can be throttled to reduce the airflow and $O_2$ concentration in the exhaust. This in turn will increase the equivalence ratio at the catalyst and drive it into the rich region to generate $H_2$ and CO. It is also possible to adjust the fuel flow to the reformer to adjust the equivalence ratio or to adjust both the engine throttle and the fuel flow to obtain the desired reformer equivalence ratio.

The equivalence ratio at the reformer and at the oxidation catalyst can be calculated from a number of engine parameters, including engine RPM and throttle setting (which in turn provides engine air flow), engine inlet air flow rate, turbo boost pressure, torque, engine fuel flow, and fuel processor fuel flow(s). Alternatively, the exhaust $O_2$ level can be measured using an $O_2$ sensor in the exhaust upstream of the fuel processor and combined with the fuel processor fuel flow to calculate equivalence ratios.

The systems and methods described herein may be further understood with reference to the following non-limiting examples.

EXAMPLE 1

Temperature Uniformity in System Without Pre-Combustor

Figure 4A:
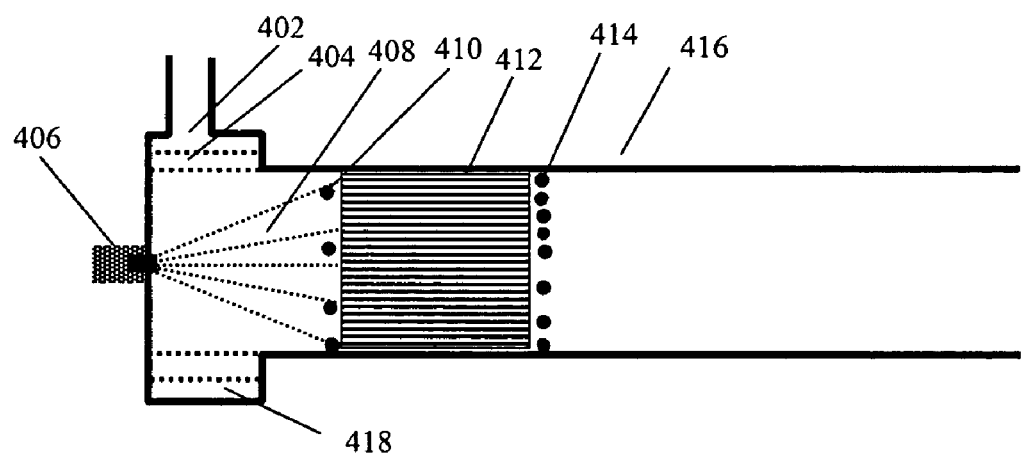
FIGS. 4A and 4B provide illustrations of test reactor set ups.
Figure 4B:
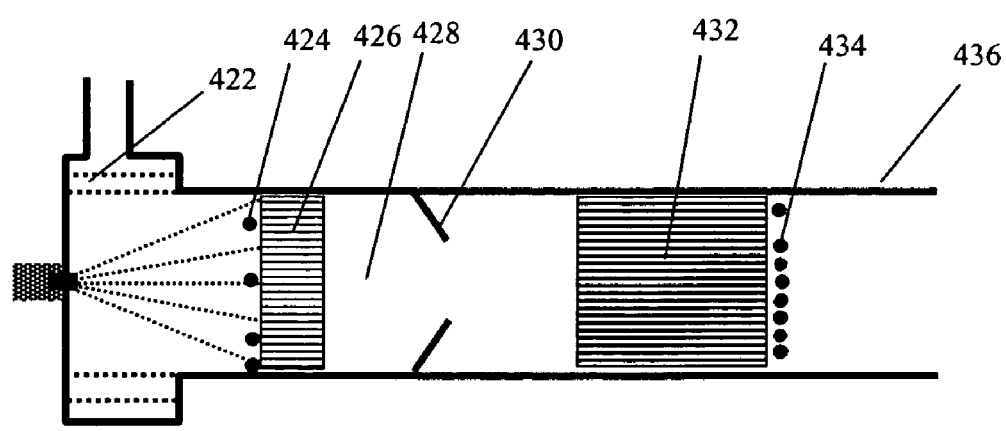

Exhaust from an 8.3 diesel engine was fed into a fuel combustor. The fuel combustor was an autothermal reforming catalyst, as described in U.S. patent application Ser. No. 10/309,936, which is hereby incorporated by reference in its entirety. The autothermal catalyst had a diameter of about 76 mm and was about 76 mm long. Diesel fuel was injected through a diesel fuel injector into the diesel exhaust stream in a test reactor (400) essentially as shown in FIG. 4A. A perforated plate (404) having 1.6 mm holes and a 23% open area was placed in the flow path to help improve the uniformity of exhaust to the inlet of either the fuel combustor (412) or, in instances where test reactor (420) was used, the pre-combustor (426) as shown in FIG. 4B. The diesel fuel injector was purchased from Mitsubishi (model number MR560553), and produced a spray cone containing most of the spray droplets within about a 50° solid angle. The inlet faces of the fuel combustor (412) or pre-combustor (426) were located such that the spray cone essentially covered the inlet combustor face. Four thermocouples (410, 424) were placed at the inlet face of the fuel combustor or pre-combustor (412, 426) and 8 thermocouples (414, 434) were placed at the outlet face of the fuel combustor or pre-combustor (412, 426).

The engine was started and ramped to approximately 50% load. A portion of the exhaust was directed through the autothermal catalyst at a flow of about 650 SLPM (standard liters per minute). The engine was run for about 20 minutes to allow the catalyst test section to reach steady state. This is shown by region A in FIG. 5. As shown there, all the thermocouples are reading temperatures in the range of about 305° C. to about 320° C. Diesel fuel was then injected at a flow rate of approximately 8.1 cc/min, resulting in a rise in the outlet temperature of the fuel combustor, which is indicated by region B on FIG. 4. The fuel flow was essentially continuous and at this flow rate the fuel air mixture was lean. Fuel flow was then increased and, at region C in FIG. 4, was about 21.0 cc/min. As demonstrated in FIG. 4, while the inlet temperature to the catalyst is relatively constant, the outlet temperature is very non-uniform, showing a temperature range from about 580° C. to about 850° C., or a spread of about 270° C. The injector cycle was then changed to inject fuel in a discontinuous manner, specifically on for 0.3 seconds and off for 0.7 seconds with a fuel flow of 25.4 cc/min. This is shown in region D in FIG. 4, where the exhaust and fuel mixture is rich during fuel injection and a portion of the diesel fuel is reformed to $H_2$ and CO as described in U.S. patent application Ser. No. 10/715,722, the portions of which relating to the generation of periodic rich and lean conditions is hereby incorporated by reference in their entirety. Under this periodic rich condition, the catalyst temperature at the outlet ranged from about 620° C. to about 870° C. for a spread of about 250° C.

EXAMPLE 2

Temperature Uniformity in System with Pre-Combustor

A pre-combustor was prepared as follows. An aluminum containing metal foil (DURAFOIL, Engineered Materials Solutions) of 0.051 mm thick was corrugated to form a herringbone corrugation pattern with channels having a height of 1.9 mm and a peak to peak channel width of 4.2 mm. The foil was coated on one side only with 5 mg of catalyst per $cm^2$ of foil area. The catalyst consisted of 5% by weight of Pd supported on a $ZrO_2$ support produced as described in U.S. Pat. No. 5,250,489, Example 4. The pre-combustor catalyst was 25 mm long and had a 76 mm diameter.

The pre-combustor was then installed in a system similar to the system described in Example 1 above and shown in FIG. 4B. That is, the inlet to the pre-combustor was positioned at the same distance from the fuel injector as the authothermal catalyst in Example 1 above. Thus, the fuel injected in the pre-combustor system, essentially covered the entire inlet face of the pre-combustor. The autothermal catalyst described above, was then positioned 100 mm downstream from the pre-combustor outlet and a static mixer consisting of four 20 mm by 20 mm tabs attached to the flow path wall in a radial pattern as shown in FIG. 4B. Three thermocouples were placed around the pre-combustor inlet and 7 thermocouples were placed just downstream of the autothermal catalyst. The performance of the pre-combustor system is shown in FIG. 6.

Figure 5:
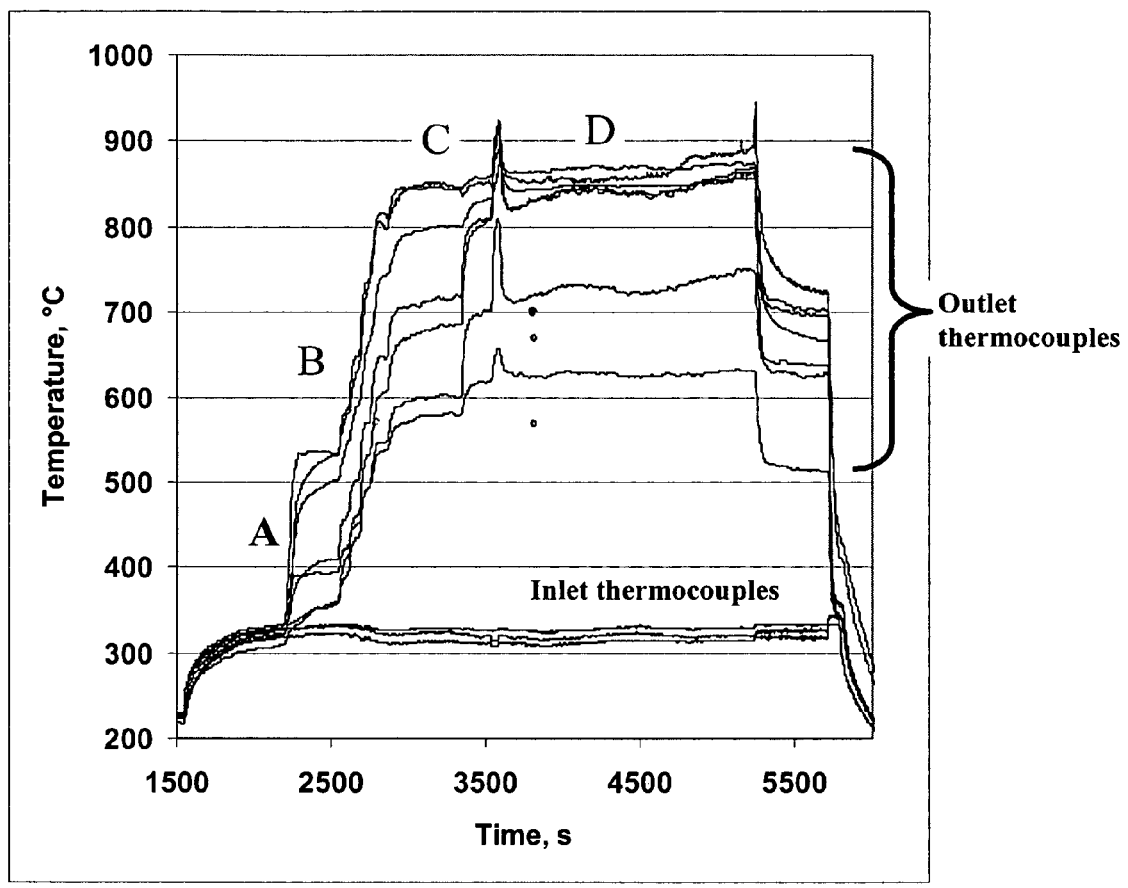
FIGS. 5 and 6 provide graphical representations of performance test data for systems without and with a pre-combustor respectively.
Figure 6:
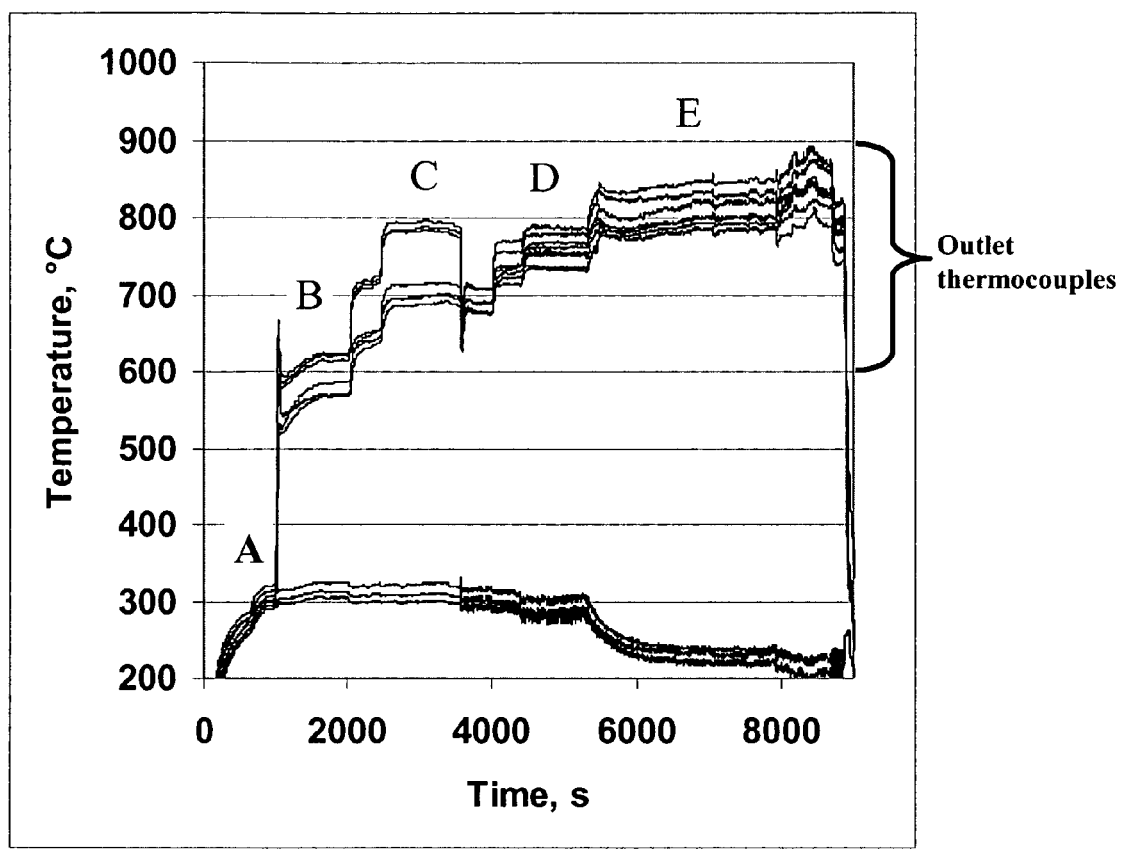

Making reference now to FIG. 6, the engine is brought to about 50% load at region A and a portion of the engine exhaust is diverted to provide a flowrate of 650 SLPM to the test system. Diesel fuel was injected in an essentially continuous manner and brought to a flowrate of 18.0 cc/min as shown by region B. The fuel flow was then increased slightly to 20.3 cc/min, as shown in region C. Under these conditions the fuel air mixture was essentially lean and the fuel was combusted to $CO_2$ and $H_2O$. As shown in FIG. 5, temperatures at the outlet of the autothermal catalyst ranged from about 690° C. to about 795° C. for a spread of about 95° C. The injector cycle was then changed so that fuel was injected in a discontinuous manner, specifically, on for about 0.3 seconds and off for about 0.7 seconds with the average fuel flow set to a flow of about 35.6 cc/min, where only $H_2$ and CO are produced. The outlet temperatures were measured and ranged from about 785° C. to about 850° C. for a spread of about 65° C.

The temperature spreads measured in these tests are summarized in Table 1, and demonstrate that use of the pre-combustor systems described herein help provide a substantially uniform temperature at a main catalyst outlet.

TABLE 1

Temperature Spread Results in Systems with and without Pre-combustors

| System configuration | Condition | Spread ° C. |
|---|---|---|
| No pre-combustor | Lean | 270 |
|  | Rich | 250 |
| With pre-combustor | Lean | 95 |
|  | Rich | 65 |

Although illustrative variations of the present invention have been described above, it will be evident to one skilled in the art that various changes and modifications may be made without departing from the invention. It is intended in the following claims to cover all such changes and modifications falling within the true scope and spirit of the invention.

We claim:

1. A system comprising:
   an engine operative to produce exhaust;
   a fuel injector configured to inject fuel into a stream of the exhaust from the engine;
   a pre-combustor comprising an oxidation catalyst and configured to receive the exhaust stream together with fuel injected by the fuel injector;
   a fuel combustor comprising a fuel reforming catalyst and configured to receive the exhaust stream from the pre-combustor;
   a lean NOx trap configured to receive the exhaust stream from the fuel combustor;
   wherein the pre-combustor is operative to combust a first portion of the injected fuel and to vaporize another portion of the injected fuel;
   the fuel combustor is operative to form an effective amount of $H_2$ and CO for generating the lean NOx-trap when the exhaust stream from the pre-combustor is overall rich; and
   the lean NOx trap is functional to adsorb and store NOx from the exhaust stream when the exhaust stream is overall lean and to reduce and release stored NOx when the exhaust stream is overall rich.

2. The system of claim 1 further comprising a mixer, wherein the mixer is located downstream from the pre-combuster, but upstream of the fuel combustor.

3. The system of claim 2 wherein the mixer is a static mixer.

4. The system of claim 1 wherein the pre-combustor and the fuel combustor are joined by a length of pipe, wherein the length of pipe has a L/D ratio greater than 2.

5. The system of claim 2 wherein at least a portion of the mixer is coated with a catalyst capable of catalyzing the oxidization of varnish or carbonaceous deposits.

6. The system of claim 2 wherein the mixer comprises at least one swirler.

7. The system of claim 1 wherein the fuel injector is an engine cylinder fuel injector.

8. The system of claim 1 wherein the pre-combustor is about 0.05 to about 1 times the volume of the fuel combustor.

9. The system of claim 8 wherein the pre-combustor is about 0.1 to about 0.7 times the volume of the fuel combustor.

10. The system of claim 9 wherein the pre-combustor is about 0.2 to about 0.4 times the volume of the fuel combustor.

11. The system of claim 1 wherein the average hydraulic diameter of the pre-combustor combustor channels is about 0.2 mm to about 10 mm.

12. The system of claim 11 wherein the average hydraulic diameter of the pre-combustor channels is about 0.5 mm to about 7 mm.

13. The system of claim 12 wherein the average hydraulic diameter of the pre-combustor channels is about 1 mm to about 5 mm.

14. The system of claim 1 wherein the pre-combustor comprises a support material comprising an iron based metal alloy.

15. The system of claim 1 wherein the pre-combustor comprises a support material comprising an alloy containing aluminum.

16. The system of claim 1 wherein the pre-combustor comprises a washcoat of zirconia, titania, alumina, silica, lanthanum, cerium, calcium, barium, chromium, and mixtures thereof.

17. The system of claim 1 wherein the oxidation catalyst comprises palladium.

18. The system of claim 1 wherein the oxidation catalyst comprises platinum.

19. The system of claim 1 wherein the pre-combustor is configured to be heated by passage of an electrical current therethrough.

20. The system of claim 1 wherein the pre-combustor comprises longitudinal channels configured in a herringbone pattern.

21. The system of claim 1 wherein the pre-combustor comprises a plurality of longitudinal channels for the exhaust to pass through, of which only about 20% to about 80% are coated with the oxidation catalyst.

22. The system of claim 1 wherein the pre-combustor is formed by spiral winding a corrugated foil so that adjacent layers of the catalyst are substantially unbonded to each other.

23. A method treating a lean exhaust stream comprising the steps of:
    absorbing NOx from the lean exhaust stream using a lean $NO_x$ trap;
    selectively injecting fuel into the lean exhaust stream to form an overall rich exhaust stream;
    passing the overall rich exhaust stream through a pre-combustor, whereby the pre-combustor combusts a portion of the injected fuel,
    passing the exhaust stream from the pre-combustor to a fuel reformer, whereby the fuel reformer generates a reducing gas mixture comprising a substantial amount of CO and $H_2$; and passing the reducing gas mixture through the lean $NO_x$ trap, whereby the $NO_x$ trap is regenerated
    wherein the overall rich exhaust stream mixes while passing between the pre-combustor and the fuel reformer to provide a substantially uniform mixture at the inlet of the fuel reformer.

24. The method of claim 23 wherein the lean exhaust stream is compression ignition engine exhaust.

25. The method of claim 23 wherein the fuel is diesel fuel.

26. The method of claim 23 wherein a substantial portion of the injected fuel is vaporized by the pre-combustor. but not combusted by the precombustor.

27. The method of claim 23 wherein the fuel is injected at an equivalence ratio from about 1.5 to about 5.

28. The method of claim 23 further comprising the step of electrically heating the pre-combustor.

29. The method of claim 23 wherein the step of injecting fuel into the exhaust stream further comprises pulsing the injection of fuel into the exhaust stream.

30. A method for generating a substantially uniform fuel air mixture in an exhaust stream comprising the steps of:
    injecting fuel into a lean exhaust stream at a rate that provides an equivalence ratio greater than one upstream of a pre-combustor, wherein the exhaust stream comprises air;
    passing the exhaust stream with the fuel through the pre-combustor;
    combusting only a part of the fuel in the pre-combustor;
    vaporizing another portion of the fuel, that passes from the fuel combustor;
    passing the exhaust from the pre-combustor through a length of pipe, which optionally contains a static mixer;
    whereby, a substantially uniform fuel air mixture is provided downstream from the pre-combustor, the fuel air mixture comprising a substantial amount of oxygen.

31. The method of claim 30 wherein the length of pipe contains the optional mixer.

32. The method of claim 31 wherein the mixer is a static mixer.

33. The method of claim 31 wherein the length of pipe has a L/D ratio greater than 2.

34. The method of claim 31 wherein at least a portion of the mixer is coated with a catalyst capable of catalyzing the oxidation of varnish or carbonaceous deposits.

35. The method of claim 31 wherein the mixer comprises at least one swirler.

36. A method of treating an exhaust stream comprising the steps of:
    passing the exhaust stream through a diesel particulate filter, whereby particulate matter is filtered from the exhaust and becomes trapped in the diesel particulate filter;
    injecting fuel into the exhaust upstream of a pre-combustor, wherein the exhaust stream comprises air;
    combusting a portion of the injected fuel in the pre-combustor while vaporizing another portion of the iniected fuel;
    providing a substantially uniform mixture of vaporized fuel and air, the fuel and air having passed through the pre-combustor, at the entrance to the diesel particulate filter;
    combusting the substantially uniform mixture within the diesel particulate filter to heat at least a portion of the diesel particulate filter to a soot combustion temperature;
    regenerating the diesel particulate filter by combusting trapped soot.

37. The method of claim 36 wherein the exhaust stream is compression ignition engine exhaust.

38. The method of claim 36 wherein the fuel is diesel fuel.

39. The method of claim 36 wherein the fuel is at least partially vaporized prior to injection.

40. The method of claim 36 further comprising mixing the exhaust stream in a static mixer located between the pre-combustor and the diesel particulate filter.

41. The method of claim 36 further comprising the step of electrically heating the pre-combustor.

42. The method of claim 36 wherein the step of injecting fuel into the exhaust stream further comprises pulsing the injection of fuel into the exhaust stream.

43. The system of claim 1, wherein the fuel combustor and the pre-combustor are configured such that the fuel combustor only operates on material that first passes through the pre-combustor.

44. The system of claim 1, wherein the pre-combustor is configured to receive all the exhaust produced by the engine.

45. The system of claim 1, wherein all the exhaust received by the lean NOx trap is received from the fuel combustor.

46. The system of claim 1, wherein the fuel combustor injector is configure to inject the fuel as a spray directed to impinge upon an inlet face of the pre-combustor.

47. The method of claim 23, wherein the lean exhaust stream is passed through the pre-combustor and the fuel reformer while absorbing NOx from the lean exhaust stream using the lean $NO_x$ trap.

48. The method of claim 23, wherein the entire exhaust stream treated by the lean NOx trap passes through the pre-combustor and the fuel reformer.

49. The method of claim 23, wherein:
the lean exhaust comprises molecular oxygen; and
while injecting fuel into the lean exhaust stream to form an overall rich exhaust stream, at least about 20% of the molecular oxygen passes to the fuel reformer.

* * * * *